No. 669,524. Patented Mar. 12, 1901.
H. W. HEERDT.
GLASS BLOWING MACHINE.
(Application filed Mar. 21, 1900.)

(No Model.) 4 Sheets—Sheet 1.

Witnesses:
Richard Scherpe
Curt Gesell.

Inventor:
Heinrich Wilhelm Heerdt
by ........ 
Attorney.

No. 669,524. Patented Mar. 12, 1901.
H. W. HEERDT.
GLASS BLOWING MACHINE.
(Application filed Mar. 21, 1900.)

(No Model.) 4 Sheets—Sheet 2.

Witnesses:
Richard Scherpe
Curt Gesell

Inventor:
Heinrich Wilhelm Heerdt.
by
Attorney.

No. 669,524. Patented Mar. 12, 1901.
H. W. HEERDT.
GLASS BLOWING MACHINE.
(Application filed Mar. 21, 1900.)
(No Model.) 4 Sheets—Sheet 3.
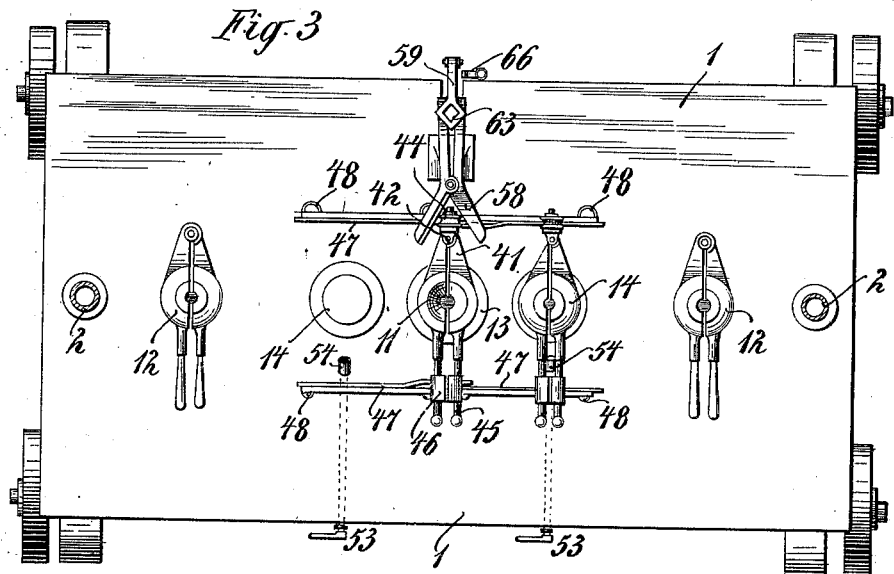
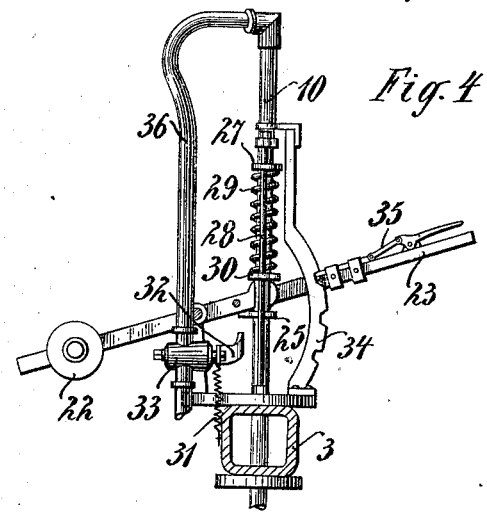
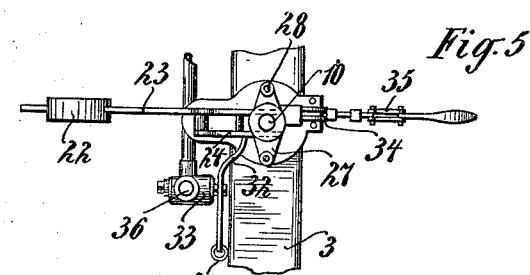
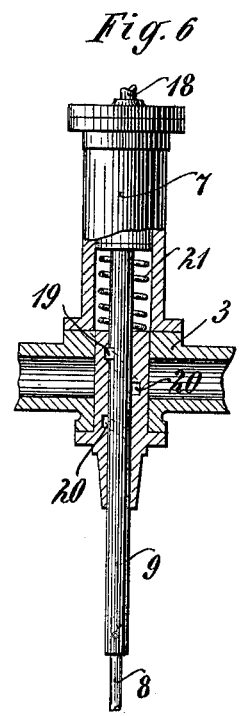
Witnesses:
Richard Scherpe
Curt Gesell.
Inventor:
Heinrich Wilhelm Heerdt.
by _____ Attorney.

No. 669,524. Patented Mar. 12, 1901.
H. W. HEERDT.
GLASS BLOWING MACHINE.
(Application filed Mar. 21, 1900.)
(No Model.) 4 Sheets—Sheet 4.

Witnesses:
Richard Scherpe
Curt Gesell

Inventor:
Heinrich Wilhelm Heerdt.
by Carter & Heister
Attorney

UNITED STATES PATENT OFFICE.

HEINRICH WILHELM HEERDT, OF AUSSIG, AUSTRIA-HUNGARY.

GLASS-BLOWING MACHINE.

SPECIFICATION forming part of Letters Patent No. 669,524, dated March 12, 1901.

Application filed March 21, 1900. Serial No. 9,623. (No model.)

*To all whom it may concern:*

Be it known that I, HEINRICH WILHELM HEERDT, a citizen of the Empire of Austria-Hungary, and a resident of Aussig, (whose post-office address is Prodlitzerstrasse No. 911, Aussig,) Austria-Hungary, have invented certain new and useful Improvements in Glass-Blowing Machines, of which the following is a specification.

The present invention relates to an improved glass-blowing machine, principally for the manufacture of bottles, which is adapted to be operated by two persons and will produce, according to size and nature, from one hundred and fifty to two hundred bottles per hour.

In the annexed drawings the machine is represented as a whole and in detail.

Figure 1:
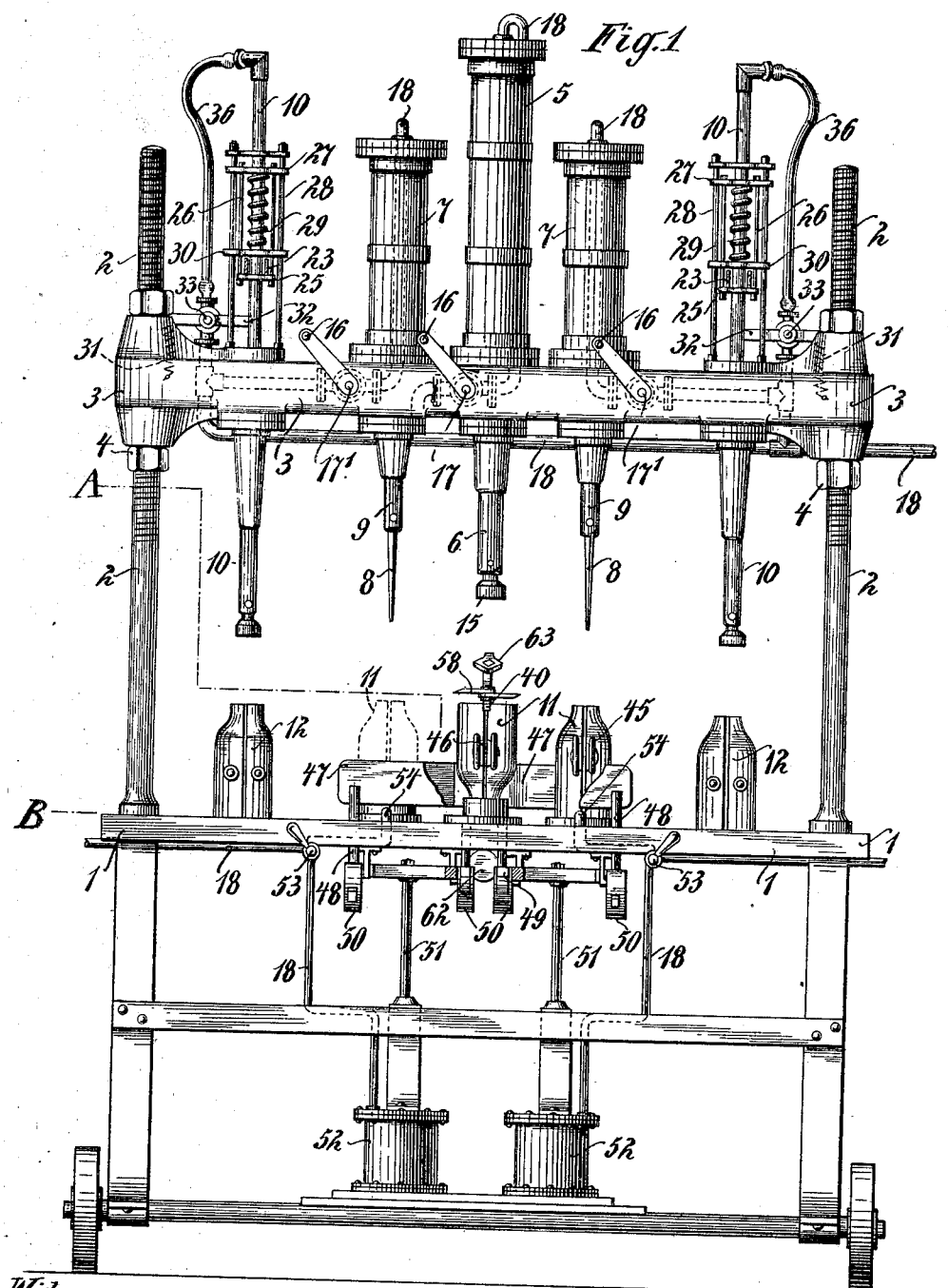
Figure 2:
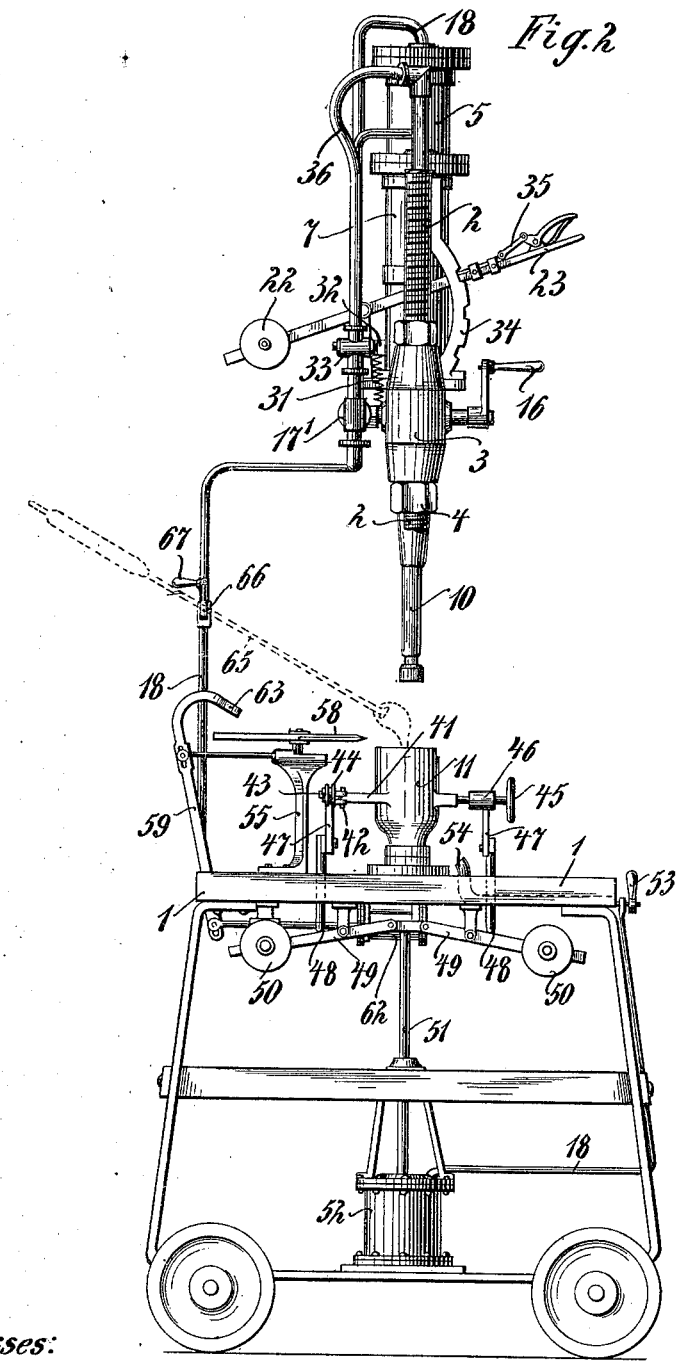
Figure 8:
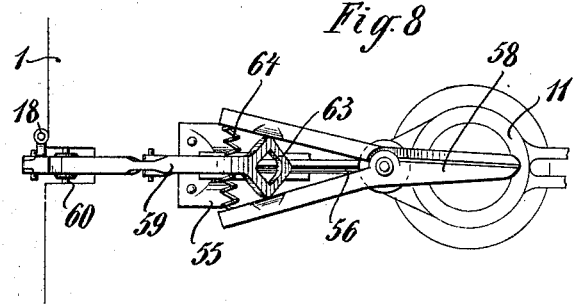
Figure 9:
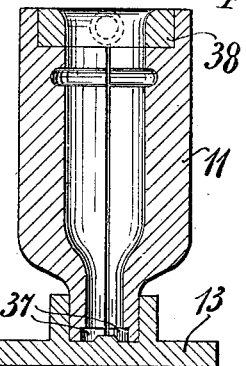
Figure 10:
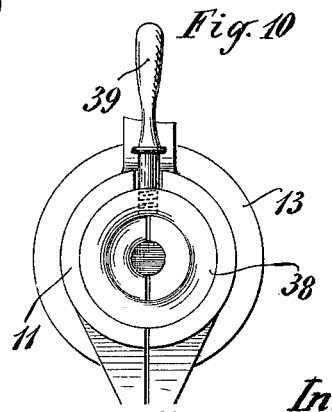

Figure 1 is a front view of the machine; Fig. 2, a side view with the parts to the left of the line A B in Fig. 1 omitted. Fig. 3 is a view of the work-table in plan, and Figs. 4 and 5 show the device for operating the piston of the blowing apparatus from the side and in plan. Fig. 6 shows the device for turning the forming-tool, and Figs. 7 and 8 the device for cutting off the glass, while Figs. 9 and 10 show the press-mold in vertical section and from below.

The construction of the machine is as follows:

The work-table 1 rests upon a movable frame, and from its surface, close to the two narrow edges, rise two supports 2 of a bridge 3, which can be raised or lowered by means of the screw-nuts 4. Into this bridge three cylinders are inserted vertically. In the center one of these, 5, the piston of the rammer 6 moves, while each of the pistons of the two side ones, 7, is provided with a long forming-tool 8 in a socket 9. At each side of the three cylinders is a blowing-stamp 10, also passing through the bridge. Upon the work-table are four molds, two of which, in the middle, are press-molds 11, of uniform construction, and two blowing-molds 12, also of uniform construction, one at each end. During the manufacturing process one of the press-molds 11 is inserted upside down into the neck 13 in the middle of the table, (see Figs. 9 and 10,) which fits around the neck of the mold, while the other press-mold remains upright on one of the plates 14, the upper part of which reaches into the mold and is forced apart from the lower part by means of a spring. The rammer 6 above the inverted press-mold has a head 15, which is removable and corresponds in diameter to the inside of the press-mold which is being used. The rammer and its piston are operated by pressing down the handle 16, and thereby opening the valve 17 of the compressed-air pipe 18, whereupon compressed air enters the cylinder 5 above the piston. When the valve has been closed again after the piston has been forced down, the latter is forced up again by a spring in the cylinder. Both the valve 17 and the two valves 17' of the forming-tool cylinders are duplex valves, which when closed connect the interior of the cylinder with the outer air and when open connect the interior of the cylinder with the compressed-air supply. The upward-and-downward movement of the pistons 9 with the movable tools 8 is effected in the same manner. In the case of these, however, the forming-tool is caused to revolve around its own longitudinal axis during the movement in order that it can be easily withdrawn from the glass lump and that the mouth of the bottle will be smooth. For this purpose, as shown in Fig. 6, the piston has a projection 19, which runs in the helical groove 20 in the guides. On pressure being brought to bear on the piston in the cylinder 7, the piston and socket 9, and therefore the tools 8, are forced during the descent to follow the winding of the helical groove, and consequently to revolve around their longitudinal axes. The same takes place during the ascent, which is caused by the spring 21.

In the case of the two blowing-stamps 10 the compressed air, which is introduced from above and passes through the hollow stamp, only serves to blow the lump in the blowing-mold 12. The downward movement of this stamp is caused by means of the hand-lever 23, Figs. 4 and 5, with the counterweight 22. A rectangular projection 24 of the said lever grasps the stamp and presses upon a horizontal plate 25, which slides upon the stamp. This plate is connected, by means of two rods 26, with a plate 27, sliding upon the stamp higher up and guided by two rods 28, which also serve as guides for the stamp itself. The plate 27 is supported by a helical spring, which rests upon a third plate 30, fixed to the stamp and through which the connecting-rods 26 pass. When the lever 23 is drawn downward into the horizontal position, the spring, pressing against the fixed plate 30 and not yet compressed by the plate 27, causes the stamp to descend until it rests upon the mold. On the lever being forced down still farther the spring is compressed as the stamp is resting upon the mold and the two plates 25 and 27, connected together, are moved downward, sliding along the stamp. In doing so the lower plate 25 presses upon the lever 32 of the compressed-air valve 33, the said lever resting upon a spring 31. Compressed air is thereby admitted through the blowing-stamp to the lump in the blowing-mold. The hand-lever 23 can be fixed in the horizontal or operative position by means of the spring-click 35, which catches in the segment 34. The blowing-stamp is connected with the compressed-air apparatus by means of a pipe 36.

The press-mold 11 is a thick-sided hollow mold, Fig. 9, with the enlargement 37 for the mouth-lip. It is considerably narrower than the blowing-mold and flared at the bottom. The press-ring 38 fits into the hollow at the bottom, and its handle 39 passes through an opening 40 at the edge of the mold, Fig. 1. The portion of the mold up to the hollow for the press-ring serves to measure the quantity of glass. When it is full, the projecting glass is cut off and the press-ring 38 applied by hand, as in ordinary press-molds. The press-ring serves also as a guide for the head 15 of the rammer 6.

To facilitate the inverting and reserving after pressing of the press-mold, the following device is provided: The two halves of the mold are, as usual, connected by hinges 41, Figs. 2 and 3, the pins 42 of which are jointed to the horizontal axle 43 of a reel 44. Upon each of the handles 45 of the mold is a short semicylinder, which together form a complete cylinder. By means of the reel and the cylinder the mold can be rolled to and fro on the two parallel rails 47, provided at the back and the front, and can easily be turned over. For this purpose it must, however, first be lifted from the neck 13 or the plate 14, respectively. In order to facilitate this, which requires some exertion, as the bottoms fit down tightly, the rails carrying the reel 44 and the cylinder 46, and consequently the whole mold, are fixed to the supports 48, which slide vertically in the work-table and can be elevated by means of a lever device operated by compressed air, while when the lever device is put out of operation the weight of the mold forces the rails down again. The said lever device (see Fig. 2) consists of the double-armed levers 49, upon the outer arms of which the rails rest. The said outer arms are provided with weights 50. The inner arms of the said levers are jointed to the T-shaped head (see Fig. 1) of a piston-rod 51, which moves in a cylinder 52, placed upon the lower frame of the machine. On the valve 53 being opened compressed air from the pipe 16 enters above the piston 51, which draws one arm of the levers downward, and consequently lifts the supports 48, carrying the rails. Each of the two rails is divided in the middle, so that one half can be elevated without the other. Of course an elevating device is provided for each pair of rails. (See Fig. 1.) A continuous current of air flows through the nozzles 54 against the press-molds in order to keep the latter cool.

Figure 7:
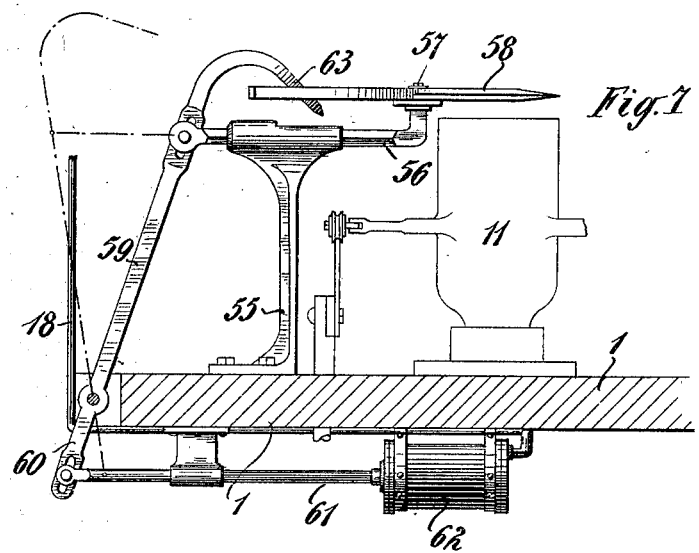

With the machine herein described the glass brought on the pontil is cut off mechanically in order to save the operator the trouble of picking up and laying down the scissors. As shown in Fig. 2, a cutting device, which is represented on a larger scale in Figs. 7 and 8, is provided in the middle of the table behind the inverted press-mold. The rod 56 slides vertically in the support 55, the end pointing toward the press-mold being turned upward and carrying the pivot 57 of the scissors 58, the levers and blades of which are not placed crosswise, but side by side. In order to move the open scissors above the mold 11 and to close them there, the double-armed lever 59 is jointed to the rod 56, carrying the scissors. The short arm 60 of the lever is connected with the piston 61 of the cylinder 62, provided beneath the table, while the long arm extends beyond its articulation to the rod 56 and then bends downward and broadens into the shape of a rhombus. On compressed air acting upon the piston of the cylinder 62 the upper part of the lever 59 forces the rod 56, carrying the open scissors, forward toward the mold 11. When the blades of the scissors are nearly over the mold, slight further movement of the lever drives its wedge-shaped end 63 between the levers of the scissors, which are connected by a spring 64, and forces them apart, thereby closing the blades of the scissors. The return movement is effected by means of a spring in the cylinder 62. First the blades are opened, and then the whole scissors are moved backward.

The machine described herein operates, therefore, in the following manner: The operator, who stands behind the table near the furnace, takes some glass from the pot with the pontil 65, Fig. 2, and holds it above the inverted mold 11, standing in the center of the table, resting the pontil upon the hook 66, fixed to the compressed-air pipe 18, the valve 67 of which operates the mechanical scissors. When sufficient glass has run into the mold, the operator opens the valve 67, which causes the mechanical scissors to cut off the glass. The same or another operator standing in front of the machine places the press-ring 38 upon the press-mold 11 and draws down the lever 16 of the valve 17, and thus causes the rammer 6 to descend, which compresses the glass in the mold, in doing which the mouth-lip is completed externally. Then he opens the valve 53, operating the lever device of the rails 47, and rolls the mold, turning it upright at the same time, to the right or the left to above one of the plates 14 and closes the valve 53, so that the rails descend with the mold and the latter is left standing upright upon the plate. Then he opens the valve 17′ by pulling down the corresponding handle. The corresponding forming-tool descends while rotating, enters the mouthpiece of the lump hanging in the mold, and ascends again immediately the valve is closed. Then the operator opens the mold, takes the lump out with a pair of tongs, and places it into the blowing-mold, which he then closes so far that the lump remains visible between the two parts of the mold. He then pulls the lever 23 into the horizontal position, and thereby causes the blowing-stamp 10 to descend to the blowing-mold 12, which he does not close entirely until the lump has expanded sufficiently. Then he opens the air-valve by pulling the lever 23 down entirely, upon which compressed air enters and blows out the lump into a bottle.

All parts of the machine, except the rammer and the scissors, are provided in duplicate, so that while the lump is being completed in the blowing-mold another one may be taken in hand.

Having now particularly described and ascertained the nature of this invention and in what manner the same is to be performed, I declare that what I claim is—

1. In a glass-blowing machine the combination with a work-table and two supports carrying a movable bridge of three cylinders inserted vertically into said bridge, a piston with a rammer in the center cylinder, pistons with forming-tools in the two side cylinders, a blowing-stamp at each end of the bridge, a blowing-mold below each blowing-stamp, two press-molds, one neck below the rammer and one neck below each of the forming-tools, substantially as shown and described.

2. In a glass-blowing machine the combination with a work-table and two supports carrying a movable bridge, three cylinders bearing a rammer and two forming-tools in the center and a blowing-stamp at each end, of means for lowering said rammer, forming-tools and blowing-stamp, substantially as shown and described.

3. In a glass-blowing machine the combination with a work-table and two supports carrying a movable bridge, three cylinders bearing a rammer and two forming-tools in the center and a blowing-stamp at each end, of hand-levers with counterweights for the blowing-stamps, two plates connected by rods and movable on said stamps, a spring below the upper plates resting upon a plate fixed to the stamp, air-valve levers below the lower movable plates, substantially as shown and described.

4. In a glass-blowing machine the combination with a work-table and two supports carrying a movable bridge, three cylinders bearing a rammer and two forming-tools in the center and a blowing-stamp at each end of projections on the forming-tool pistons gliding in helical grooves of the guides, substantially as shown and described.

5. In a glass-blowing machine the combination with a work-table and two supports carrying a movable bridge, three cylinders bearing a rammer and two forming-tools in the center and a blowing-stamp at each end, of two movable press-molds, vertical reels connected with the pivot of the latter, rails movable vertically in front and behind said molds, substantially as shown and described.

6. In a glass-blowing machine the combination with a work-table and two supports carrying a movable bridge, three cylinders bearing a rammer and two forming-tools in the center and a blowing-stamp at each end, of two movable press-molds, vertical reels connected with the pivot of the latter, rails movable vertically in front and behind said molds, of means for raising and lowering said rails, substantially as shown and described.

7. In a glass-blowing machine the combination with a work-table and two supports carrying a movable bridge, three cylinders bearing a rammer and two forming-tools in the center and a blowing-tube at each end, of two movable press-molds, vertical reels connected with the pivot of the latter, rails movable vertically in front and behind said molds, of supports carrying said rails and double-armed levers carrying said supports and being operated by compressed air, substantially as shown and described.

8. In a glass-blowing machine the combination with a work-table and two supports carrying a movable bridge, three cylinders bearing a rammer and two forming-tools in the center and a blowing-tube at each end, of scissors arranged below the rammer and carried on a horizontal gliding rod, a double-armed lever having a rhombical top and governing said scissors, substantially as shown and described.

In testimony whereof I affix my signature in presence of two witnesses.

HEINRICH WILHELM HEERDT.

Witnesses:
BERTHOLD EISNER,
ADOLPH FISCHER.